(12) United States Patent
Lee et al.

(10) Patent No.: US 9,555,331 B2
(45) Date of Patent: Jan. 31, 2017

(54) MOVING CONTROL DEVICE, MOVING CONTROL METHOD, AND INFORMATION RECORDING MEDIUM

(71) Applicant: KONAMI DIGITAL ENTERTAINMENT CO., LTD., Tokyo (JP)

(72) Inventors: Kuka Lee, Musashino (JP); Kenta Takahashi, Funabashi (JP); Kentaro Nagayama, Osaka (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 242 days.

(21) Appl. No.: 14/467,055

(22) Filed: Aug. 25, 2014

(65) Prior Publication Data
US 2015/0057056 A1 Feb. 26, 2015

(30) Foreign Application Priority Data
Aug. 26, 2013 (JP) .................. 2013-174505

(51) Int. Cl.
| | | |
|---|---|---|
| *A63F 13/42* | (2014.01) | |
| *A63F 13/573* | (2014.01) | |
| *A63F 13/426* | (2014.01) | |
| *A63F 13/2145* | (2014.01) | |
| *A63F 13/812* | (2014.01) | |

(52) U.S. Cl.
CPC ......... *A63F 13/573* (2014.09); *A63F 13/2145* (2014.09); *A63F 13/426* (2014.09); *A63F 13/812* (2014.09)

(58) Field of Classification Search
CPC .... A64F 13/573; A64F 13/145; A64F 13/426; A64F 13/812
See application file for complete search history.

(56) References Cited

U.S. PATENT DOCUMENTS

| | | | |
|---|---|---|---|
| 8,629,845 B2* | 1/2014 | Homma | G06F 3/0416 345/173 |
| 2002/0054151 A1* | 5/2002 | Inomata | G06F 1/1626 715/810 |
| 2005/0215323 A1 | 9/2005 | Miyamoto et al. | |
| 2007/0155455 A1* | 7/2007 | Fujioka | A63F 13/10 463/3 |
| 2010/0160011 A1 | 6/2010 | Izumi et al. | |
| 2010/0283758 A1* | 11/2010 | Homma | G06F 3/0416 345/174 |
| 2010/0295814 A1* | 11/2010 | Kent | G06F 3/044 345/174 |

(Continued)

FOREIGN PATENT DOCUMENTS

| | | |
|---|---|---|
| JP | 2005-192986 A | 7/2005 |
| JP | 2007-037664 A | 2/2007 |
| JP | 2011-055998 A | 3/2011 |

*Primary Examiner* — Corbett B Coburn
(74) *Attorney, Agent, or Firm* — Hubbs, Enatsky & Inoue PLLC

(57) ABSTRACT

An obtaining unit of a moving control device obtains a first contact position and a second contact position on a touch panel. A determination unit determines information about a trajectory of a moving object in a virtual space based on the first contact position and second contact position. A moving control unit moves the moving object in the virtual space based on the information.

15 Claims, 13 Drawing Sheets

(56) References Cited

U.S. PATENT DOCUMENTS

| | | | | |
|---|---|---|---|---|
| 2012/0056814 A1* | 3/2012 | Sudo | ............... | G06F 3/04886 345/168 |
| 2012/0092289 A1* | 4/2012 | Tsumura | ............... | G06F 3/0416 345/174 |
| 2013/0021259 A1* | 1/2013 | Sudo | ............... | G06F 3/04883 345/169 |
| 2013/0050125 A1* | 2/2013 | Sudo | ............... | G06F 3/04886 345/173 |
| 2014/0055385 A1* | 2/2014 | Duheille | ............... | G06F 3/0488 345/173 |
| 2014/0282045 A1* | 9/2014 | Ayanam | ............... | G06F 3/0484 715/740 |
| 2014/0320418 A1* | 10/2014 | Tseng | ............... | G06F 3/04883 345/173 |
| 2014/0362003 A1* | 12/2014 | Kimn | ............... | G06F 3/041 345/173 |

\* cited by examiner

FIG.10

| CONTACT POSITION CONDITION | | TRAJECTORY CHARACTERISTICS INFORMATION |
|---|---|---|
| POSITION INSIDE BALL | POSITION OUTSIDE BALL | |
| NEAR CENTER | — | DIRECTION: STRAIGHT<br>SPEED: FAST<br>ROTATION: NOT MUCH |
| NEXT TO BALL | — | DIRECTION: SLANT<br>SPEED: SLOW<br>ROTATION: MUCH |
| BELOW BALL | — | DIRECTION: UPWARD<br>SPEED: NORMAL<br>ROTATION: NORMAL |
| ABOVE BALL | — | DIRECTION: HORIZONTAL<br>SPEED: NORMAL<br>ROTATION: NORMAL |
| TOP AREA | — | DIRECTION: HORIZONTAL<br>SPEED: VERY SLOW<br>ROTATION: NOT MUCH |
| — | ABOVE REFERENCE POSITION | DIRECTION: HORIZONTAL |
| — | BELOW REFERENCE POSITION | DIRECTION: UPWARD |
| ⋮ | ⋮ | ⋮ |

MOVING CONTROL DEVICE, MOVING CONTROL METHOD, AND INFORMATION RECORDING MEDIUM

CROSS-REFERENCE TO RELATED APPLICATION

The present application claims priority from Japanese application JP 2013-174505 filed on Aug. 26, 2013, the content of which is hereby incorporated by reference into this application.

BACKGROUND OF THE INVENTION

1. Field of the Invention

The present invention relates to a moving control device, a moving control method, and an information recording medium.

2. Description of the Related Art

There has been known a moving control device for moving an object to be moved (hereinafter referred to as "moving object") (for example, a ball) in a virtual space. Japanese Patent Application Laid-open No. 2007-37664, for instance, describes a game device for executing a video game in which a character moves a ball by kicking when a user presses a button on a controller.

SUMMARY OF THE INVENTION

With the technology described above, operation of moving a moving object in a virtual space is made easier if more intuitive operation is provided to a user who is attempting to move the moving object in the virtual space.

The present invention has been made in view of the above, and an object of the present invention is therefore to provide a moving control device, a moving control method, and an information recording medium which are capable of facilitating the operation of moving a moving object in a virtual space.

In order to attain the above-mentioned object, according to one embodiment of the present invention, there is provided a moving control device, including: an obtaining unit that obtains a first contact position and a second contact position on a touch panel; a determination unit that determines information about a trajectory of a moving object in a virtual space based on the first contact position and the second contact position; and a control unit that controls moving of the moving object in the virtual space based on the information.

According to one embodiment of the present invention, there is provided a moving control method, including: obtaining a first contact position and a second contact position on a touch panel; determining information about a trajectory of a moving object in a virtual space based on the first contact position and the second contact position; and controlling moving of the moving object in the virtual space based on the information.

According to one embodiment of the present invention, there is provided a non-transitory computer-readable information recording medium having recorded thereon a program for causing a computer to perform a function of: obtaining a first contact position and a second contact position on a touch panel; determining information about a trajectory of a moving object in a virtual space based on the first contact position and the second contact position; and controlling moving of the moving object in the virtual space based on the information.

BRIEF DESCRIPTION OF THE DRAWINGS

FIG. 10 is a table showing the association between a contact position and trajectory characteristics information.

DETAILED DESCRIPTION OF THE INVENTION

An exemplary embodiment of the present invention is described in detail below with reference to the accompanying drawings. A moving control device (a computer) according to the present invention is implemented by, for example, one of a mobile terminal (including mobile phones such as smartphones, and portable information terminals such as tablet computers), a game machine, and a personal computer. This embodiment describes a case where the moving control device is implemented by a mobile terminal.

1. Hardware Configuration of the Mobile Terminal

Figure 1:
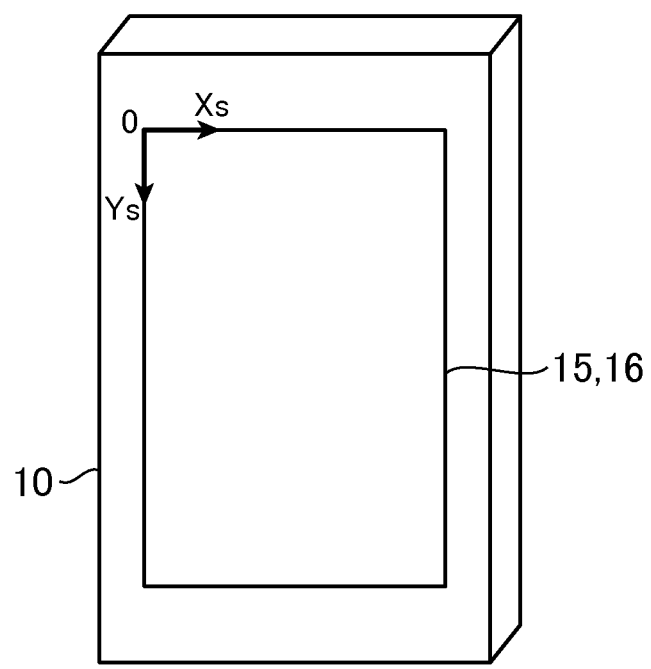
FIG. 1 is a figure showing an example of the external appearance of a mobile terminal.
Figure 2:
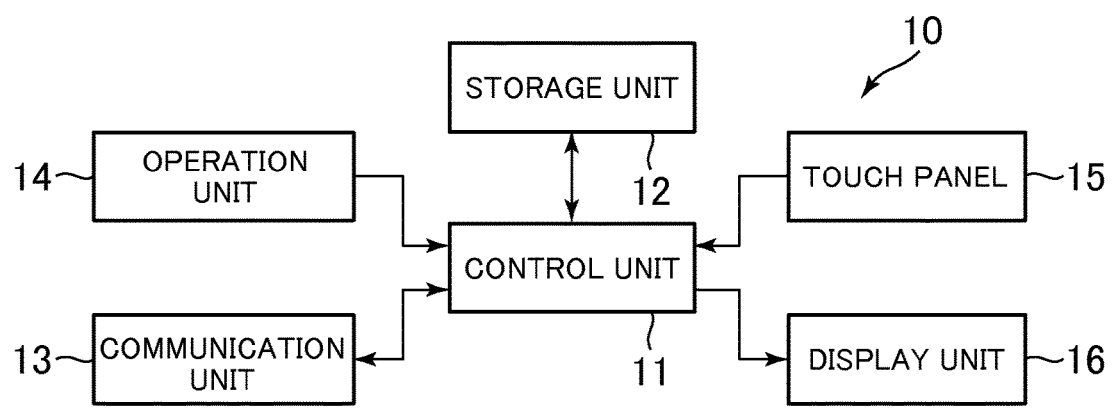
FIG. 2 is a figure showing an example of the hardware configuration of the mobile terminal.

FIG. 1 is a figure showing an example of the external appearance of the mobile terminal. Further, FIG. 2 is a figure showing an example of the hardware configuration of the mobile terminal. As showed in FIG. 1 and FIG. 2, a mobile terminal 10 includes a control unit 11, a storage unit 12, a communication unit 13, an operation unit 14, a touch panel 15, and a display unit 16.

The control unit 11 includes, for example, at least one microprocessor. The control unit 11 executes processing in accordance with an operating system stored in the storage unit 12 or another program.

The storage unit 12 includes a main memory and a nonvolatile memory. The nonvolatile memory stores a program executed by the control unit 11. For example, the program is downloaded from a server device via a communication network such as the Internet and stored in the nonvolatile memory. Alternatively, the program is copied from a computer-readable information recording medium such as a memory card and stored in the nonvolatile memory. The program read out from the nonvolatile memory and data necessary for the control unit 11 to execute the processing are written into the main memory.

The communication unit 13 is used for perform data communications. For example, the communication unit 13 executes the data communications in accordance with an instruction issued from the control unit 11.

The operation unit 14 includes, for example, buttons, a stick (lever), or a keyboard, and is used by a user to perform operation.

The touch panel 15 is a general touch panel, and detects a plurality of positions touched by the user. As the touch panel 15, for example, a capacitive touch panel is used. On the capacitive touch panel, the position touched by the user is detected based on a change of charge caused when a front surface of the touch panel 15 is touched by the user. The position touched by the user is represented by a coordinate value within such an Xs-Ys coordinate system as showed in, for example, FIG. 1, in which the left-top vertex of the touch panel 15 is set as an origin O with the right direction and the down direction set as a positive Xs-axis direction and a positive Ys-axis direction, respectively. The operating system acquires the position being touched by the user based on the information supplied from the touch panel 15.

Note that, the touch panel 15 is overlaid on the display unit 16 configured to show how a virtual space looks. Therefore, the user can designate a position within a screen displayed on the display unit 16 by touching the front surface of the touch panel 15. Note that, the user may bring his/her own finger (hand) into contact with the front surface of the touch panel 15, or may bring a body part other than the finger (hand) into contact with the front surface of the touch panel 15. Alternatively, for example, an object (such as stylus) grasped by the user may be brought into contact with the front surface of the touch panel 15.

The display unit 16 is, for example, a liquid crystal panel. The display unit 16 displays the screen in accordance with the instruction issued from the control unit 11.

Note that, the mobile terminal 10 may include an optical disc drive or a memory card slot. The optical disc drive is used for reading a program and data recorded on an optical disc (information recording medium). The memory card slot is used for reading a program and data recorded on a memory card (information recording medium). The program and the data may be supplied to the mobile terminal 10 via the optical disc or the memory card, and stored in the storage unit 12 (nonvolatile memory). Further, the program and the data, which is described as being stored in the information recording medium, may be acquired from a network via the communication unit 13.

2. Game Executed on the Mobile Terminal

The mobile terminal 10 executes a program read out of the storage unit 12, to thereby execute a video game in which a moving object (for example, a ball) is moved in the virtual space. This embodiment deals with a case of executing a soccer game in which characters move a ball in a game space to play a soccer match. At the start of the soccer game, the game space is constructed in the storage unit 12, for example.

Figure 3:
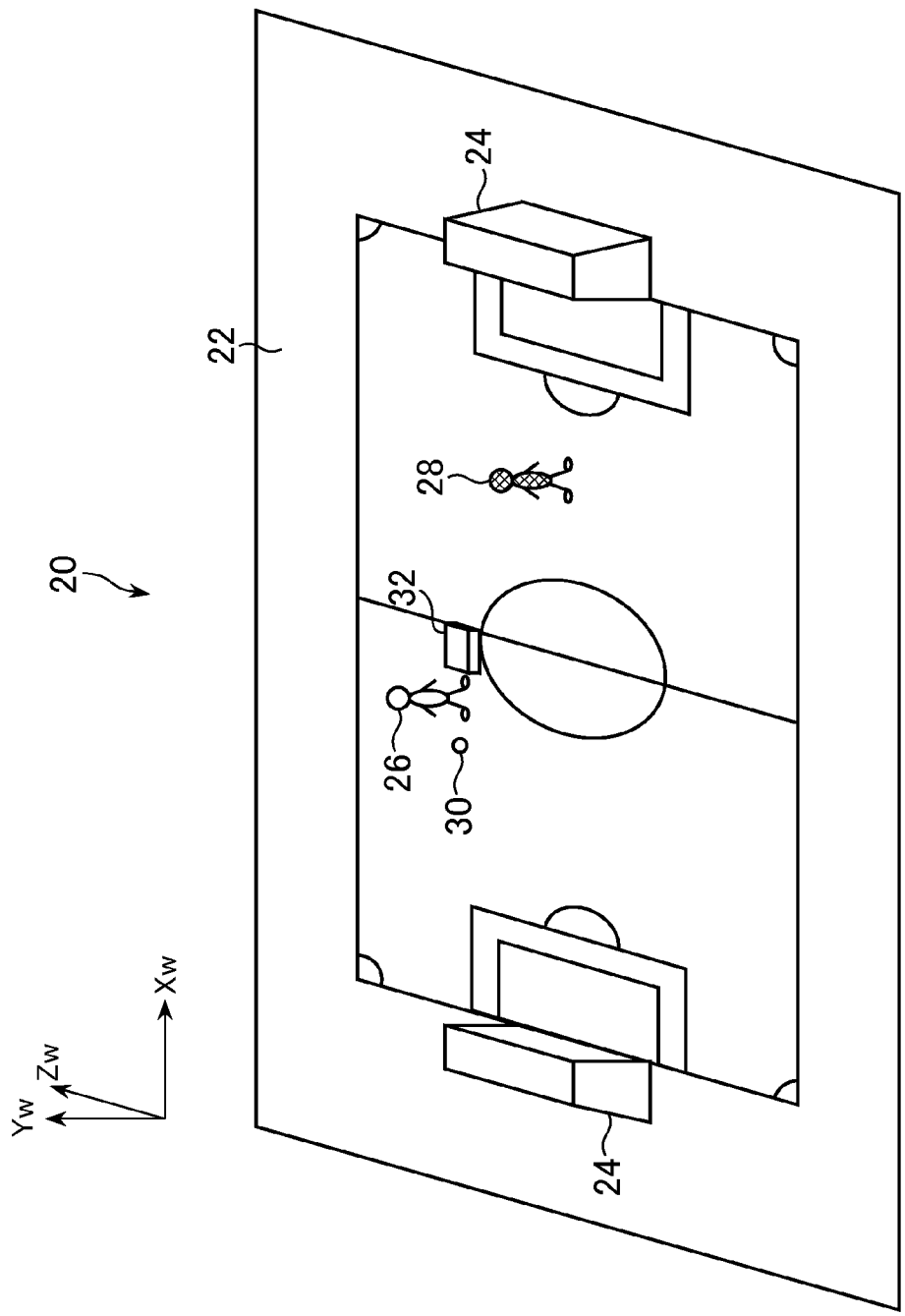
FIG. 3 is a figure showing an example of a game space.

FIG. 3 is a figure showing an example of the game space. A game space 20 is a virtual three-dimensional space in which three coordinate axes (Xw-axis, Yw-axis, and Zw-axis) that are orthogonal to one another are set. A position of each object placed in the game space 20 is identified by, for example, three-dimensional coordinates of a world coordinate system (Xw-Yw-Zw coordinate system).

As showed in FIG. 3, a field 22 being an object representing a soccer field is placed in the game space 20. On the field 22, a soccer match is played between a team (hereinafter referred to as "user team") operated by the user and a team (hereinafter referred to as "opponent team") operated by an opponent (computer or another user).

Placed on the field 22 are goals 24 being objects representing soccer goals, a character 26 being an object representing a soccer player belonging to the user team, a character 28 being an object representing a soccer player belonging to the opponent team, and a ball 30 being an object representing a soccer ball. Note that, on the field 22, there are arranged eleven characters 26 belonging to the user team and eleven characters 28 belonging to the opponent team, which are not shown in FIG. 3.

One of the characters 26 belonging to the user team is an operation object who acts based on the user's operation. The user's operation object moves in a direction instructed by the user and performs an action instructed by the user. The other characters 26 than the user's operation object and the characters 28 belonging to the opponent team act autonomously under a given behavior algorithm.

When the distance between one of the characters 26 (28) and the ball 30 becomes closer, the character 26 (28) and the ball 30 are associated with each other under a given condition. A state in which one of the characters 26 (28) and the ball 30 are associated with each other is hereinafter referred to as "the character 26 (28) is keeping a hold of the ball 30". The character 26 (28) who is keeping a hold of the ball 30 can move the ball 30 by performing a dribble action, a pass action, or a shoot action.

Further, a virtual camera 32 (point of view) is set up in the game space 20. The display unit 16 displays a game screen expressing how the game space 20 is viewed from the virtual camera 32. The game screen is generated by coordinate-converting vertex coordinates of the respective objects arranged in the game space 20 from the world coordinate system into a screen coordinate system by using a predetermined coordinate conversion operation.

Figure 4:
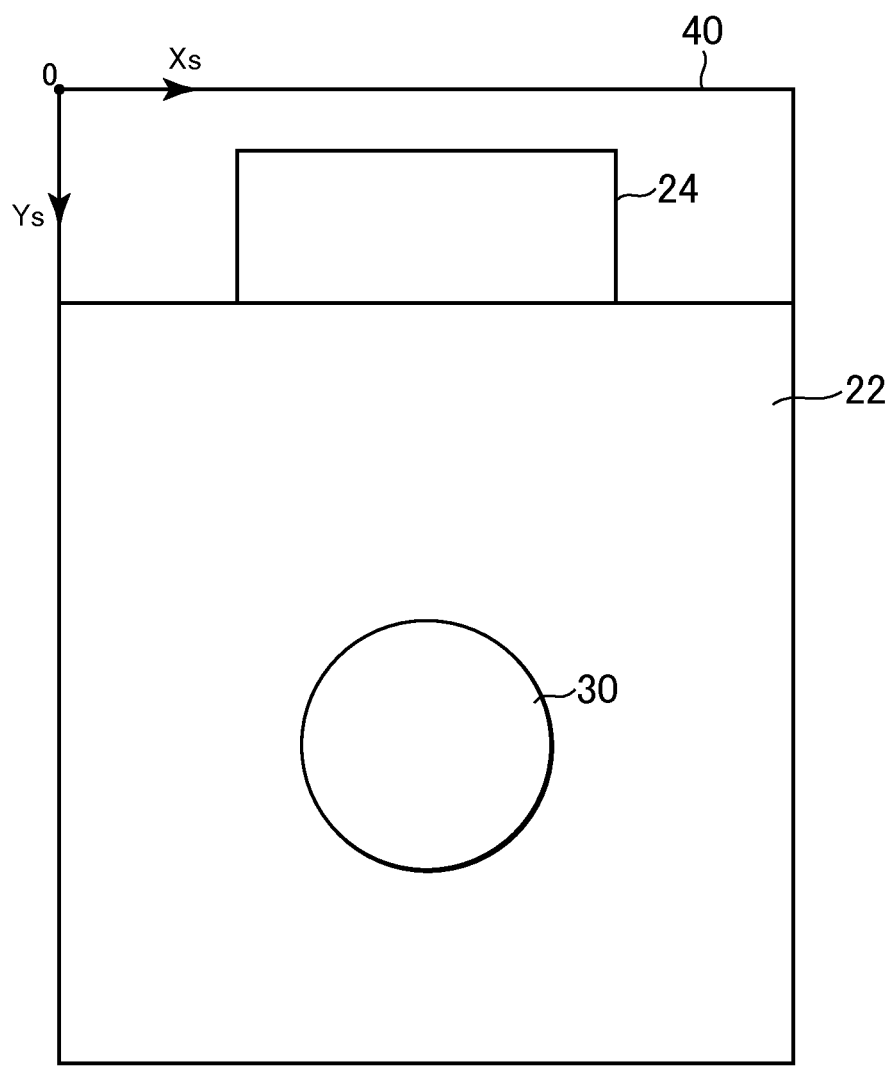
FIG. 4 is a figure showing an example of a game screen.
Figure 5:
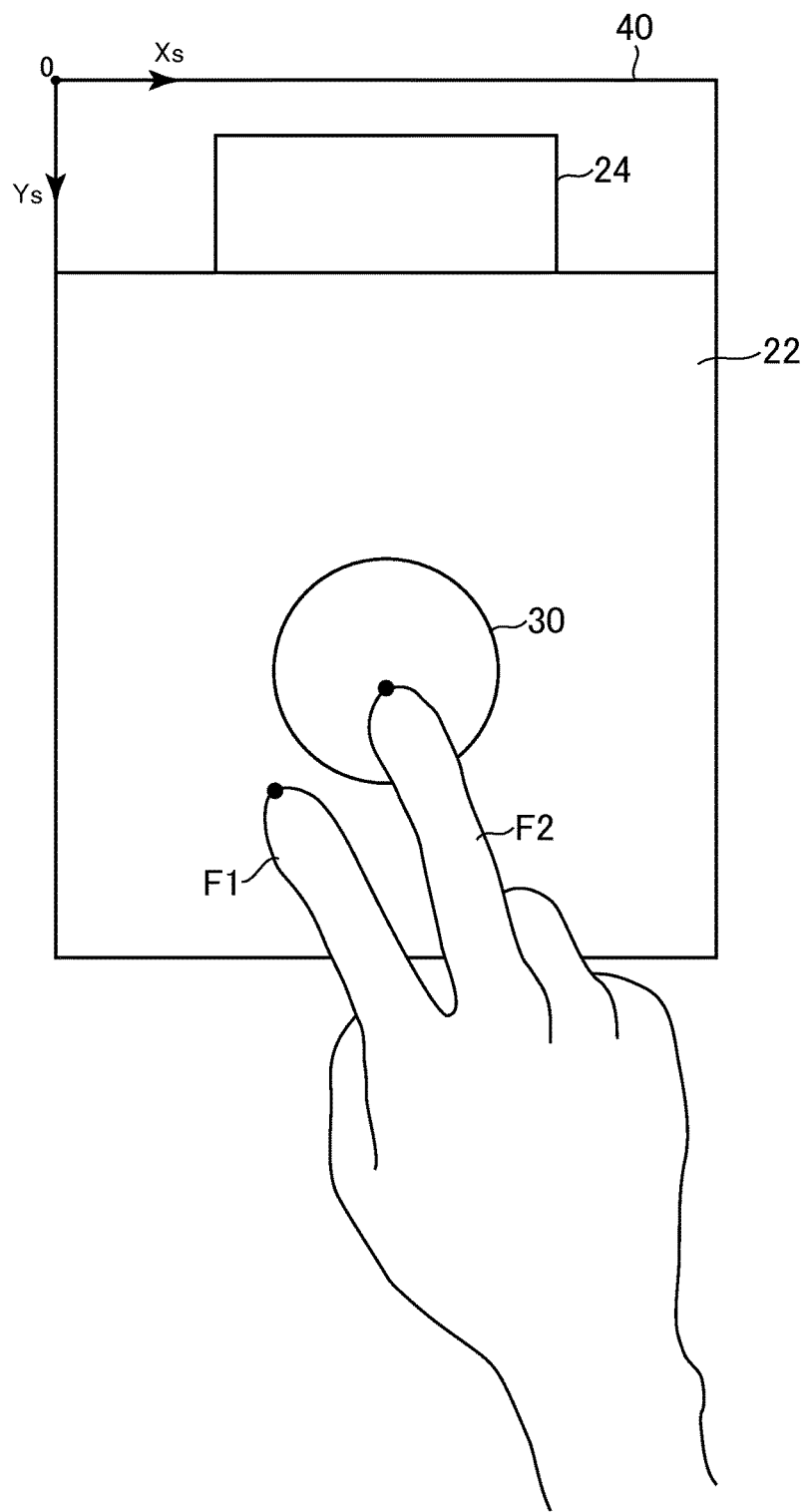
FIG. 5 is a figure showing the example of the game screen.
Figure 6:
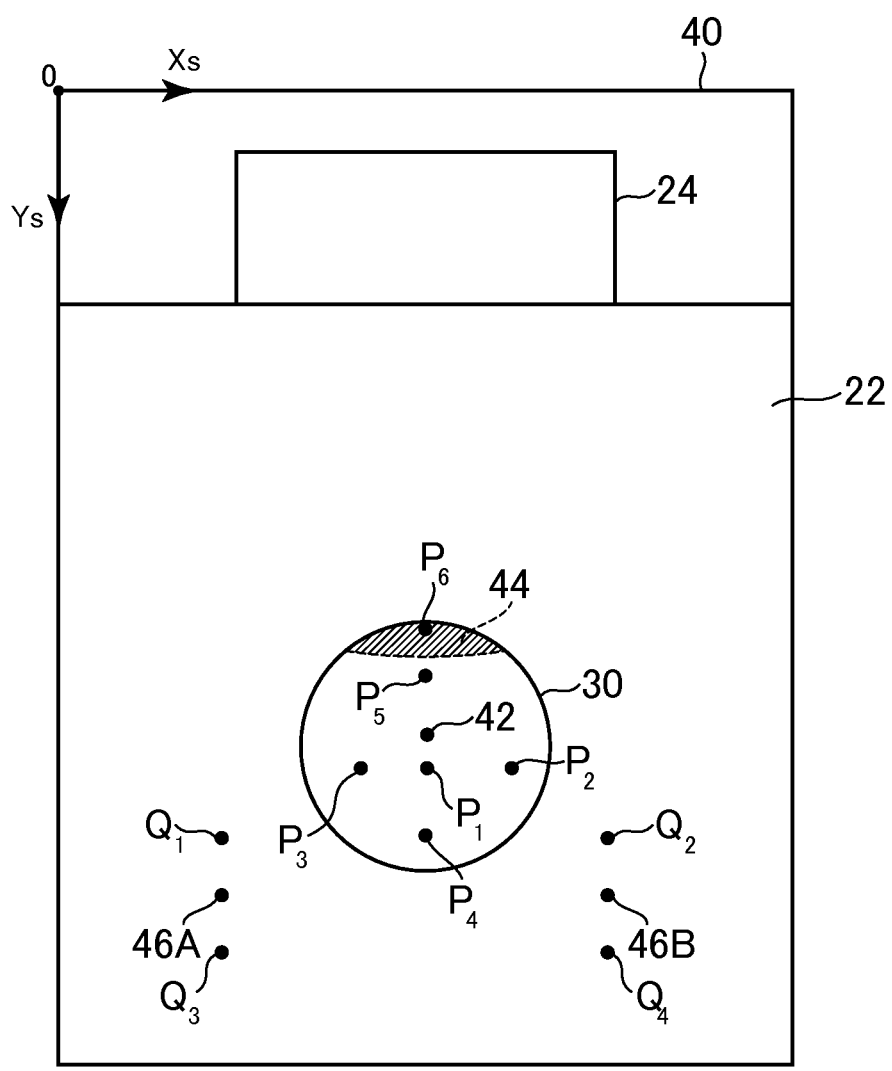
FIG. 6 is a figure showing the example of the game screen.

FIGS. 4 to 6 are figures each showing an example of the game screen. As showed in FIG. 4, the objects included in a visual field of the virtual camera 32 are displayed on a game screen 40. The position and line-of-sight direction of the virtual camera 32 are set so that, for example, the ball 30 is included in the view field of the virtual camera 32. In this embodiment, when the user's operation object is keeping a hold of the ball 30, the virtual camera is placed at the foot of the user's operation object and the line-of-sight direction is set so that the ball 30 is looked up at from about the foot of the user's operation object. The user can move the ball 30 by performing given operation on the touch panel 15 while the user's operation object is keeping a hold of the ball 30.

FIG. 5 illustrates a state in which the user's operation object is keeping a hold of the ball 30. The game is designed so that the user's operation object kicks the ball 30 when, for example, the user touches a part of the field 22 that is near the ball 30 with an index finger F1 and simultaneously touches a position in a range where the ball 30 is displayed with a middle finger F2 in this state. Here, the user's index finger F1 corresponds to the pivot foot (e.g., left foot) of the operation object and the user's middle finger F2 corresponds to the kicking foot (e.g., right foot) of the operation object. The trajectory of the ball 30 kicked by the operation object is determined in relation to the positions of contact of these fingers.

For example, when the user touches near a center point 42 of the ball 30 (a contact position $P_1$) as showed in FIG. 6, the moving speed of the ball 30 becomes relatively fast and the ball 30 does not rotate (about the ball's axis) much. The ball 30 in this case moves within the game space 20 in a direction running from the foot of the character 26 that is the operation object toward the ball 30 (hereinafter referred to as "basic movement direction"). This provides the user with intuitive operation as though kicking near the center point of the ball hard in an instep kick (to kick with the instep) or a toe kick (to kick with the toe).

When the user touches a position to the right or left of the center point 42 of the ball 30 (a contact position $P_2$ or a contact position $P_3$), the ball 30 rotates clockwise (about the ball's axis) or rotates counterclockwise (about the ball's axis) depending on the touched position. The number of rotations of the ball 30 is larger than when the ball 30 is touched near the center point 42, and the moving speed of the ball 30 is lower than when the ball 30 is touched near the center point 42. The ball 30 in this case moves within the game space 20 to the left or right of the basic movement direction when viewed from the virtual camera 32. In addition, the trajectory is curved depending on the rotation direction and number of rotations of the ball 30. This provides the user with intuitive operation as though putting a spin on the ball by making an inside kick (to kick with the inside of the foot) or an outside kick (to kick with the outside of the foot).

Figure 7:
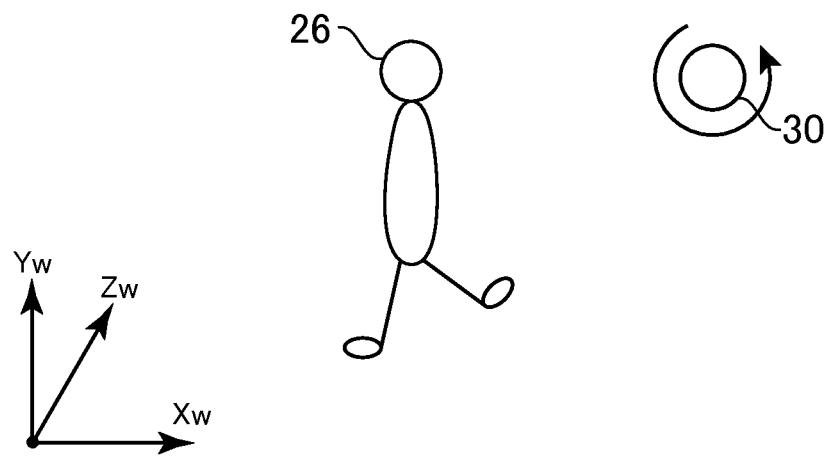
FIG. 7 is a figure showing how a ball moves when a user touches a position below the center point of a ball.

When the user touches a position below the center point 42 of the ball 30 (a contact position $P_4$), the movement direction of the ball 30 in the game space 20 is above the basic movement direction (is in the Yw-axis direction), and hence the ball 30 floats. FIG. 7 is a figure showing how the ball 30 moves in the case where the user touches a position below the center point 42 of the ball 30. As showed in FIG. 7, the ball 30 moves so as to float because the ball 30 rotates (about the ball's axis) in a longitudinal direction (the direction of the near side from the viewpoint of the operation object). This provides the user with intuitive operation as though floating the ball by making a chip kick (to kick with a part of the instep that is near the toe so as to scoop up the ball).

Figure 8:
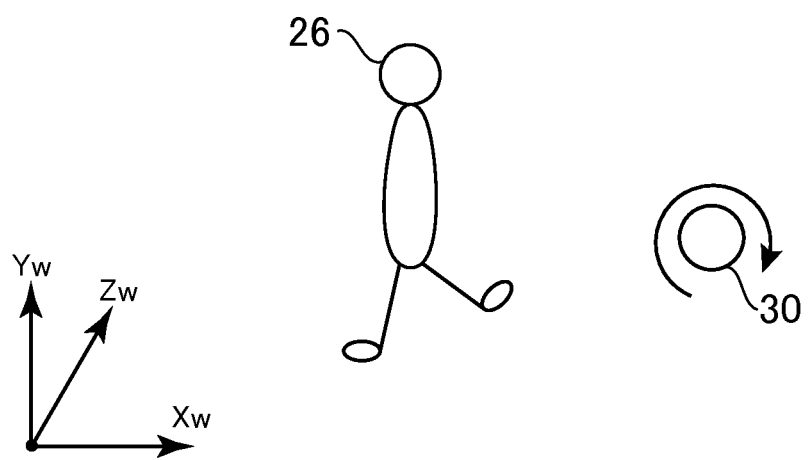
FIG. 8 is a figure showing how a ball moves when a user touches a position above the center point of the ball.

When the user touches a position above the center point 42 of the ball 30 (a contact position $P_5$), the movement direction of the ball 30 in the game space 20 is more horizontal than the basic movement direction (is in the Xw-axis direction or Zw-axis direction), and hence the ball 30 does not float. FIG. 8 is a figure showing how the ball 30 moves in the case where the user touches a position above the center point 42 of the ball 30. As showed in FIG. 8, the ball 30 moves so as not to float so much because the ball 30 rotates (about the ball's axis) in a direction opposite to the direction showed in FIG. 7 (the direction of the far side from the viewpoint of the operation object). This provides the user with intuitive operation as though kicking the ball 30 from above by making an instep kick or a toe kick.

When the user touches a top area 44, which is further above the center point 42 of the ball 30 (a contact position $P_6$), the moving speed of the ball 30 is lower than when the other positions described above are touched and the ball 30 moves so as to roll on the field 22. The top area 44 is an area that is determined based on the top of the ball 30 in the game space 20, and is a given area that includes the top of the ball 30. This provides the user with intuitive operation as though rolling the ball 30 with the sole of the foot.

Reference positions 46A and 46B are also set in the game screen 40 in this embodiment based on where the ball 30 is displayed. The reference positions 46A and 46B correspond to a basic position at which the pivot foot is placed when the user's operation object kicks the ball 30. The ball 30 in this embodiment varies its movement direction depending on the positional relation between the contact position and the reference positions 46A and 46B.

For example, when the user touches the far side beyond the reference positions 46A and 46B (in the negative Ys-axis direction) (contact positions $Q_1$ and $Q_2$), the movement direction of the ball 30 in the game space 20 is more horizontal than the basic movement direction, and hence the ball 30 does not float (the ball 30 travels on a low trajectory). This provides the user with intuitive operation as though kicking the ball 30 with the kicking foot put over the ball 30 and the pivot foot positioned in the front (on the far side).

For example, when the user touches the near side in front of the reference positions 46A and 46B (in the positive Ys-axis direction) (contact positions $Q_3$ and $Q_4$), on the other hand, the movement direction of the ball 30 in the game space 20 is above the basic movement direction, and hence the ball 30 floats (the ball 30 travels on a high trajectory). This provides the user with intuitive operation as though scooping up the ball 30 from below with the kicking foot with the pivot foot positioned in the rear (on the near side).

As described above, the mobile terminal 10 is configured so as to facilitate the operation of moving the ball 30 through the providing of more intuitive operation to a user which is accomplished by giving one of two fingers of the user the role of the pivot foot of the character 26 and giving the other finger the role of the kicking foot of the character 26. This configuration is described in detail below.

3. Functions Implemented in the Mobile Terminal

Figure 9:
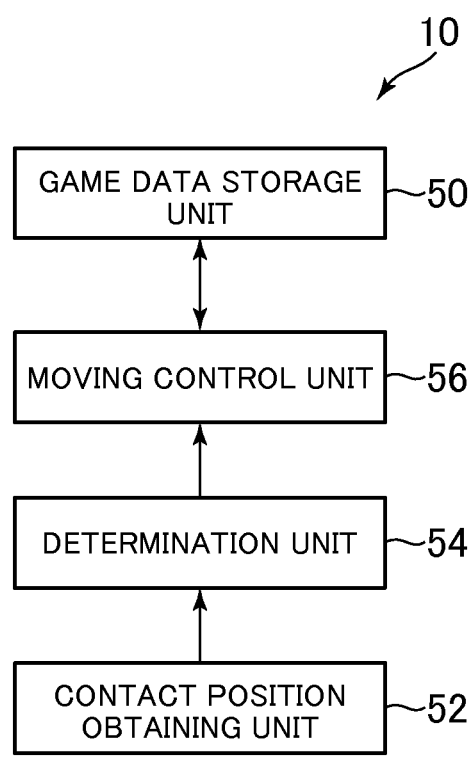
FIG. 9 is a function block diagram of the mobile terminal.

FIG. 9 is a functional block diagram of the mobile terminal 10. As showed in FIG. 9, the mobile terminal 10 includes a game data storage unit 50, a contact position obtaining unit 52, a determination unit 54, and a moving control unit 56. The mobile terminal 10 implements the respective functions showed in FIG. 9 by executing the program stored in the storage unit 12. The game data storage unit 50 is implemented mainly by, for example, the storage unit 12, and the other respective functions are implemented mainly by, for example, the control unit 11.

[3-1. Game Data Storage Unit]

The game data storage unit 50 stores data necessary to implement the soccer game. For example, the game data storage unit 50 stores the association between a contact position on the touch panel 15 and trajectory characteristics information, which indicates the characteristics of a trajectory of the ball 30.

FIG. 10 is a table showing the association between a contact position and trajectory characteristics information. Data indicating this association may be in a mathematical expression format or a table format. The association showed in FIG. 10 defines contact position conditions about contact positions. Contact position conditions here include conditions about contact positions inside the ball 30 and conditions about contact positions outside the ball 30. For instance, a condition about a deviation from a given position on the touch panel 15 (e.g., the center point 42 or the reference positions 46A and 46B), or a condition indicating whether or not a contact position is included in a given area on the touch panel 15 is stored as a contact position condition.

Trajectory characteristics information is information that defines a trajectory of the ball 30 (how the ball 30 is to be moved within the game space 20), and information indicating characteristics about at least one of the movement direction, moving speed, and rotation of the ball is stored as trajectory characteristics information. For instance, a characteristic about the movement direction of the ball 30 indicates a direction in which the ball 30 is to be moved in the form of, for example, the degree of deviation (the deviation direction and the deviation amount) from the basic movement direction. While this embodiment describes a case where the basic movement direction is a direction running from the foot of the user's operation object toward the ball 30, the basic movement direction is not limited thereto and can be any direction that is defined in association with the ball 30.

A feature about the moving speed of the ball 30 indicates a speed at which the ball 30 is to be moved within the game space 20 in the form of, for example, the degree of deviation from a basic moving speed of the ball 30. The basic moving speed of the ball 30 is a speed that is determined based on a parameter associated with the user's operation object (for example, an ability value). A characteristic about the rotation of the ball 30 indicates a direction and a number of rotations (rotational speed) in which the ball 30 is to be rotated in the form of, for example, a rotation direction of the ball 30 and the degree of deviation from a basic number of rotations of the ball 30. The basic number of rotations is, for example, the number of rotations that is determined in advance.

The game data storage unit 50 also stores game situation data which indicates the situation of the game that is running. Data indicating the current look of the game space 20 is stored as the game situation data. Examples of data stored as the game situation data include information for identifying the user's operation object, the state (e.g., position, movement direction, and moving speed) of each character 26 (28), the state (e.g., position, movement direction, moving speed, rotation direction, and number of rotations) of the ball 30, the state (e.g., position and line-of-sight direction) of the virtual camera 32, and the situation (e.g., remaining time and score) of the match.

Data stored in the game data storage unit 50 is not limited to the examples given above. For instance, the game data storage unit 50 may store for each character 26 (28) a parameter related to the character (e.g., ability value). The game data storage unit 50 can store any type of data as long as the data is necessary to move the ball 30 within the game space 20.

[3-2. Contact Position Obtaining Unit]

The contact position obtaining unit 52 obtains a first contact position and a second contact position on the touch panel 15. The contact position obtaining unit 52 obtains information (e.g., coordinate data) indicating a contact position on the touch panel 15 where the touch panel 15 is touched by the user, based on a detection signal from the touch panel 15. Here, the second contact is made while the first contact is made on the touch panel 15. In other words, the second contact is started before the first contact is removed. In the case where information indicating a contact position is obtained and then information indicating another contact position is obtained, the other contact position corresponds to the second contact position.

The touch panel 15 in this embodiment is provided so as to be overlaid on a display screen where a moving object image representing a moving object (e.g., the ball 30) is displayed (e.g., the game screen 40). It can therefore be said that the contact position obtaining unit 52 obtains the position of contact with the ball 30 displayed on the game screen 40 and the position of contact with a part of the field 22 that is near the ball 30.

[3-3. Determination Unit]

The determination unit 54 determines, based on the first contact position and the second contact position, information (e.g., information about at least one of the movement direction, moving speed, and rotation of the ball 30) about the trajectory of a moving object (e.g., the ball 30). For instance, the determination unit 54 determines information about the trajectory of the ball 30 based on the positional relation between the first contact position and the second contact position. The determination unit 54 in this embodiment determines for each contact position whether or not the contact position satisfies a contact position condition, and determines information about the trajectory of the ball 30 based on a piece of trajectory characteristics information that is associated with the contact position condition determined as satisfied.

The determination unit 54 in this embodiment determines information about the trajectory of a moving object based on the first contact position and the second contact position in the case where either the first contact position or the second contact position is inside an area that corresponds to the moving object image (for example, an area where the ball 30 is displayed) and the other is outside this area (for example, the field 22). Here, the determination unit 54 determines information about the trajectory of the ball 30 based on two contact positions one of which is inside a range where the ball 30 is displayed and the other of which is on the field 22 (contact positions obtained at the time when this state is reached or obtained a given length of time prior to or after this time).

The determination unit 54 in this embodiment also determines information about a trajectory along which a moving object moves based on either the first contact position or the second contact position that is outside an area corresponding to the moving object image (for example, the field 22 around the ball 30) and the reference positions 46A and 46B inside the display screen or the virtual space which are associated with the moving object (the ball 30, for example). The determination unit 54 determines information about the trajectory of the ball 30 based on the positional relation between the contact position and the reference positions 46A and 46B. Here, the determination unit 54 determines the positional relation between the contact position outside the ball 30 and one of the reference positions 46A and 46B that is closer to this contact position.

For example, in the case where the contact position is above (beyond) the reference positions 46A and 46B, the determination unit 54 determines information about the trajectory of the ball 30 so that the movement direction of the ball 30 is more horizontal than the basic movement direction. To give another example, in the case where the contact position is below (in front of) the reference positions 46A and 46B, the determination unit 54 determines information about the trajectory of the ball 30 so that the movement direction of the ball 30 is more vertical than the basic movement direction.

The determination unit 54 in this embodiment also determines information about the trajectory of a moving object based on the position in an area corresponding to the moving object image (for example, an area where the ball 30 is displayed) of either the first contact position or the second contact position that is inside this area. In other words, the determination unit 54 determines information about the trajectory of the ball 30 based on the positional relation between the contact position and the ball 30.

For example, in the case where the deviation of the contact position from the center point 42 is equal to or less than a given value (e.g., in the case of the contact position $P_1$ of FIG. 6), the determination unit 54 determines information about the trajectory of the ball 30 so that the deviation of the movement direction of the ball 30 from the basic movement direction is equal to or less than a reference value, and so that the ball 30 moves at a speed faster than the reference moving speed and rotates a smaller number of rotations than the reference number of rotations.

In the case where the deviation of the contact position from the center point 42 in the horizontal direction is equal to or more than the given value (e.g., in the case of the contact position $P_2$ or the contact position $P_3$ of FIG. 6), for example, the determination unit 54 determines information about the trajectory of the ball 30 so that the deviation of the movement direction of the ball 30 from the basic movement direction is equal to or more than the reference value, and so that the ball 30 moves at a speed slower than the reference moving speed and rotates a larger number of rotations than the reference number of rotations. In this case, when the contact position is to the right of the center point 42, the determination unit 54 determines information about the trajectory of the ball 30 so that the movement direction of the ball 30 is to the left of the basic movement direction, and so that the ball 30 rotates counterclockwise. When the contact position is to the left of the center point 42, the determination unit 54 determines information about the trajectory of the ball 30 so that the movement direction of the ball 30 is to the right of the basic movement direction, and so that the ball 30 rotates clockwise.

In the case where the contact position is below the center point 42 and the deviation of the contact position from the center point 42 in the vertical direction is equal to or more than a given value (e.g., in the case of the contact position $P_4$ of FIG. 6), for example, the determination unit 54 determines information about the trajectory of the ball 30 so that the movement direction of the ball 30 is more vertical (closer to the Yw-axis direction) than the basic movement direction. In the case where the contact position is above the center point 42 and the deviation of the contact position from the center point 42 in the vertical direction is equal to or more than a given value (e.g., in the case of the contact position $P_5$ of FIG. 6), for example, the determination unit 54 determines information about the trajectory of the ball 30 so that the movement direction of the ball 30 is more horizontal (closer to the Xw-axis direction or the Zw-axis direction) than the basic movement direction.

The determination unit 54 in this embodiment determines whether or not either the first contact position or the second contact position that is inside an area corresponding to the moving object image (for example, an area where the ball 30 is displayed) is in a particular part (for example, the top area 44) of this area. Based on the result of this determination, the determination unit 54 determines information about the trajectory of the moving object (the ball 30, for example). In the case where the contact position is in the top area 44, for example, the determination unit 54 determines information about the trajectory of the ball 30 so that the ball 30 rolls on the field 22 by making the movement speed of the ball 30 lower than the basic movement speed.

The method of determining information about the trajectory of the ball 30 is not limited to the examples given above. The determination unit 54 can use any method that determines information about the trajectory of the ball 30 based on the two positions of contact made by the user. For example, in the case where a contact position in a range where the ball 30 is displayed is located above and to the right of the center point 42, the determination unit 54 may determine information about the trajectory of the ball 30 so that the movement direction of the ball 30 is more horizontal than the basic movement direction, and so that the ball 30 rotates counterclockwise. To give another example, in the case where a contact position in a range where the ball 30 is displayed is located below and to the right of the center point 42, the determination unit 54 may determine information about the trajectory of the ball 30 so that the movement direction of the ball 30 is more vertical than the basic movement direction, and so that the ball 30 rotates counterclockwise.

[3-4. Moving Control Unit]

The moving control unit 56 moves a moving object (for example, the ball 30) in a virtual space (for example, the game space 20) based on the information about the trajectory that has been determined by the determination unit 54 (for example, information about at least one of the movement direction, moving speed, and rotation of the ball 30). The moving control unit 56 moves the ball 30 by substituting parameters that the information determined by the determination unit 54 indicates in a given moving algorithm.

4. Processing Executed on the Mobile Terminal

Figure 11:
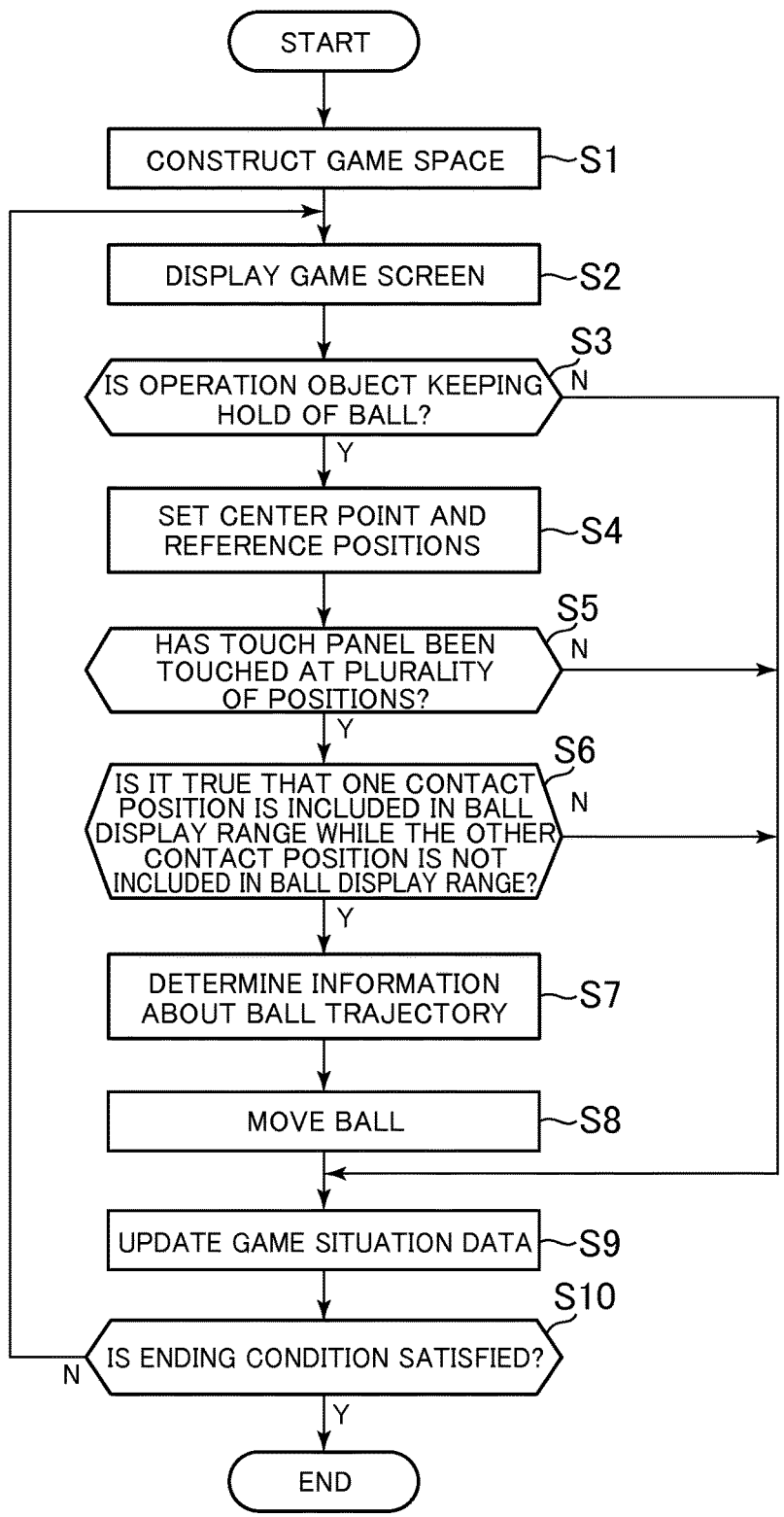
FIG. 11 is a flow chart showing processing that is executed by the mobile terminal.

FIG. 11 is a flow chart showing processing that is executed by the mobile terminal 10. The control unit 11 executes the processing of FIG. 11 following a program stored in the storage unit 12. The processing described below is run when, for example, an instruction to start the game is given.

As showed in FIG. 11, the control unit 11 first starts the game and constructs the game space 20 (Step S1). In Step S1, the control unit 11 generates the game situation data and stores the generated data in the storage unit 12. For instance, the control unit 11 places the respective characters 26 (28) and the ball 30 in their initial positions. The control unit 11 also sets, for example, the user's operation object under a given condition and sets the position and line-of-sight direction of the virtual camera 32 based on the positions of the user's operation object and the ball 30.

The control unit 11 performs control to display the game screen 40 which shows how the game space 20 looks from the virtual camera 32 (Step S2). The control unit 11 in this embodiment sets the position and line-of-sight direction of the virtual camera 32 so that the ball 30 is included in the view field of the virtual camera 32. The control unit 11 therefore displays the ball 30 on the game screen 40 in Step S2.

The control unit 11 determines whether or not the user's operation object is keeping a hold of the ball 30 (Step S3). In Step S3, the control unit 11 refers to the game situation data to determine whether or not the ball 30 is associated with the user's operation object.

When it is determined that the user's operation object is keeping a hold of the ball 30 (Step S3: Y), the control unit 11 sets the center point 42 and the reference positions 46A and 46B based on the position of the ball 30 (Step S4). For example, the control unit 11 sets as the reference positions 46A and 46B positions that are at given distances from the center point 42 of the ball 30 in given directions. These given distances and given directions may vary depending on, for example, the positional relation between the ball 30 and the virtual camera 32.

The control unit 11 determines whether or not the user has touched a plurality of positions on the touch panel 15 (Step S5). In Step S5, the control unit 11 determines whether or not a plurality of pieces of positional data have been obtained from the touch panel 15.

When it is determined that the user has touched a plurality of positions on the touch panel 15 (Step S5: Y), the control unit 11 determines whether or not it is true that one of the contact positions is included in a range where the ball 30 is displayed while the other contact positions is not included in the display range of the ball 30 (Step S6).

When it is determined that it is true that one contact position is included in the display range of the ball 30 while the other contact position is not included in the display range of the ball 30 (Step S6: Y), the control unit 11 determines information about the trajectory of the ball 30 based on the contact position that is included in the display range of the ball 30 and the contact position that is not included in the display range of the ball 30 (Step S7). In Step S7, the control unit 11 determines information about the trajectory of the ball 30 based on characteristics that are associated with contact position conditions fulfilled by the respective contact positions.

Figure 12:
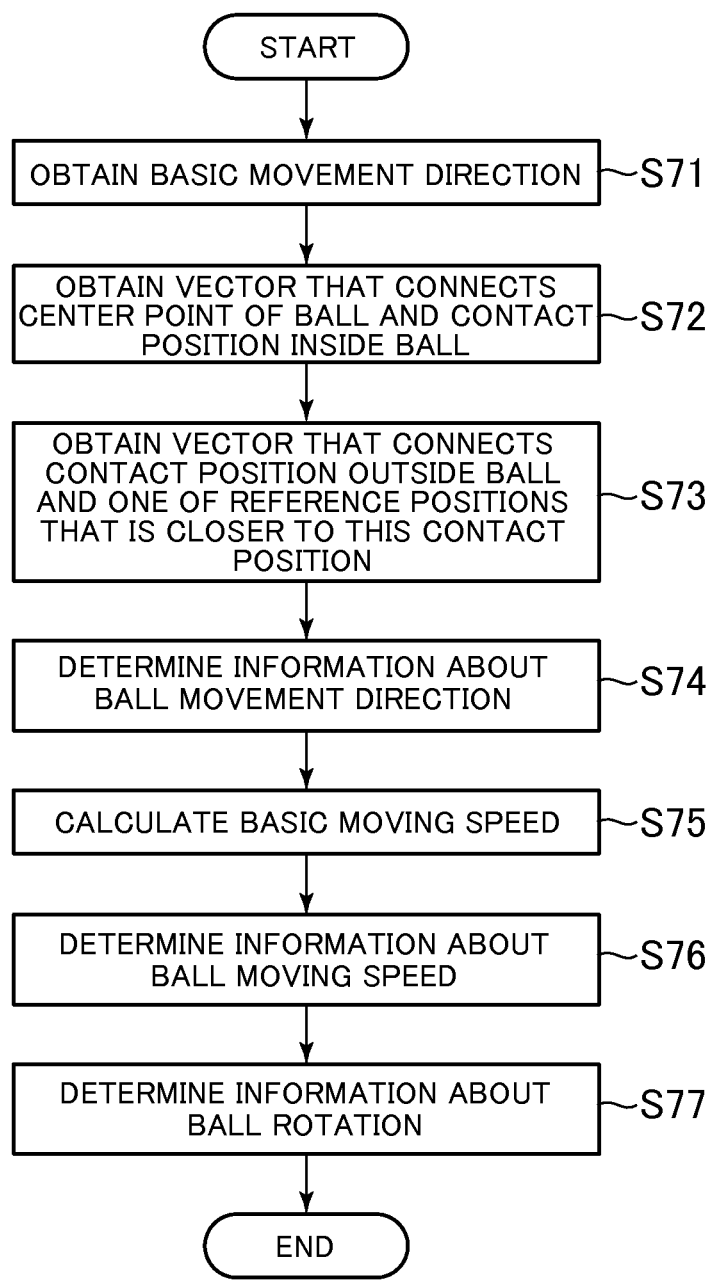
FIG. 12 is a figure showing details of processing that is executed in Step S7.
Figure 13:
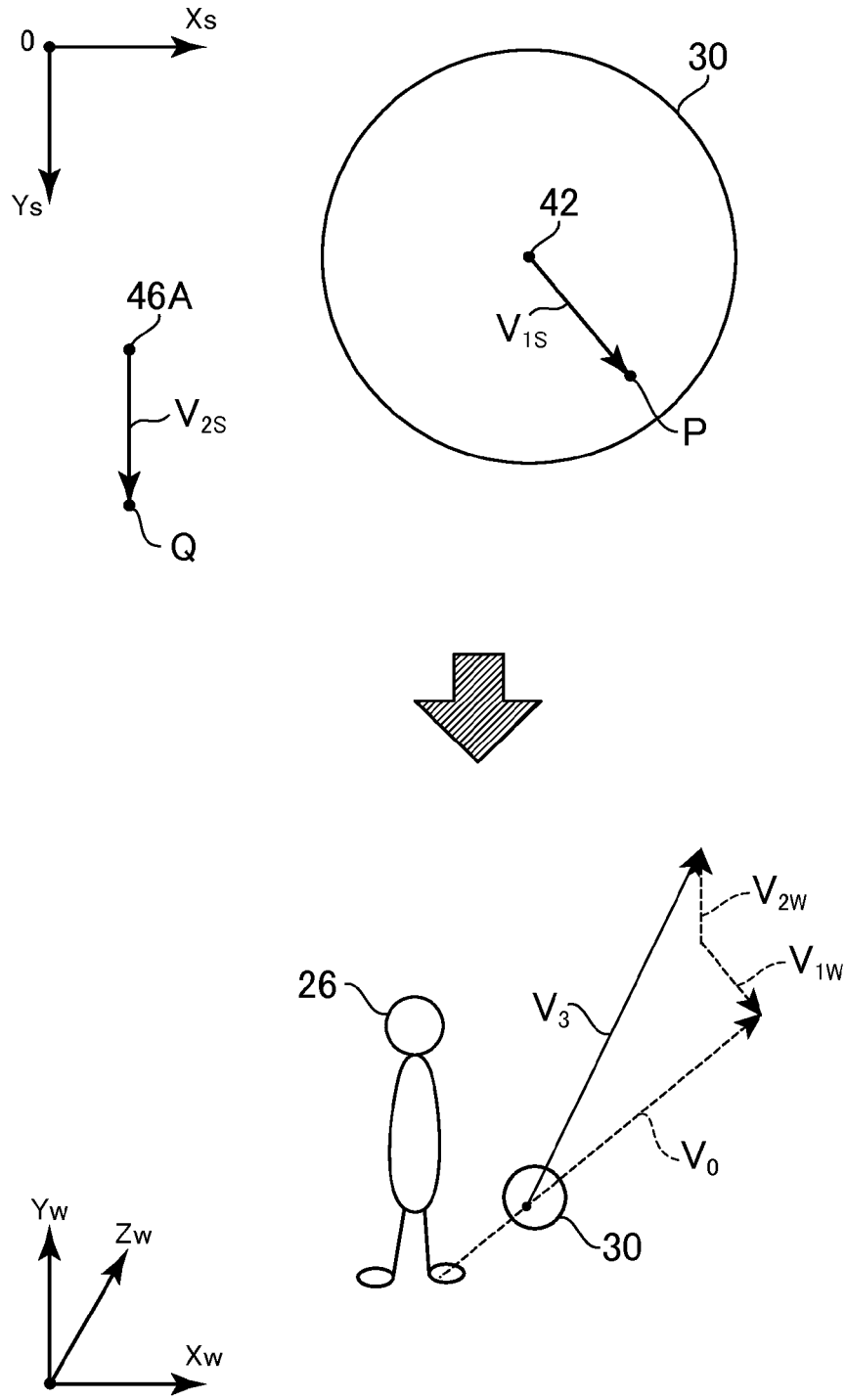
FIG. 13 is a figure showing details of the processing that is executed in Step S7.

FIGS. 12 and 13 are figures showing details of processing that is executed in Step S7. As showed in FIGS. 12 and 13, the control unit 11 refers to the game situation data to obtain a basic movement direction $V_0$ which runs from the user's operation object (e.g., from a position at the foot of the operation object) toward the ball 30 (Step S71).

The control unit 11 obtains a vector $V_{1S}$ which connects the center point 42 of the ball 30 displayed on the game screen 40 and a contact position P inside the ball 30 (Step S72). The vector $V_{1S}$ is a vector in the screen coordinate system and indicates the deviation of the contact position P from the center point 42. The control unit 11 obtains a vector $V_{2S}$ which connects a contact position Q outside the ball 30 and one of the reference positions 46A and 46B that is closer to the contact position Q (Step S73). The vector $V_{2S}$ is a vector in the screen coordinate system, and indicates the deviation of the contact position Q from the one of the reference positions 46A and 46B.

The control unit 11 changes the basic movement direction $V_0$ based on the vector $V_{1S}$ and the vector $V_{2S}$ to determine information about a movement direction $V_3$ of the ball 30 (Step S74). In Step S74, the control unit 11 obtains a vector $V_{1W}$ within the game space 20 based on the vector $V_{1S}$, and obtains a vector $V_{2W}$ within the game space 20 based on the vector $V_{2S}$. The vector $V_{1W}$ indicates a change in movement direction that is determined based on the contact position P, and the vector $V_{2W}$ indicates a change in movement direction that is determined based on the contact position Q. For instance, when the vector $V_{1S}$ points lower right, the vector $V_{1W}$ points upper left from the viewpoint of the user's operation object and, when the vector $V_{1S}$ points lower left, the vector $V_{1W}$ points upper right from the viewpoint of the user's operation object. When the vector $V_{2S}$ points downward, the vector $V_{2W}$ points in the positive Yw-axis direction and, when the vector $V_{2S}$ points upward, the vector $V_{2W}$ points in the negative Yw-axis direction.

The control unit 11 calculates the basic moving speed of the ball 30 based on an ability parameter of the user's operation object (Step S75). For instance, the control unit 11 sets a faster speed as the basic moving speed of the ball 30 when the ability parameter of the user's operation object has a higher value.

The control unit 11 changes the basic moving speed based on the vector $V_{1S}$ to determine information about the moving speed of the ball 30 (Step S76). In Step S76, the control unit 11 determines information about the moving speed of the ball 30 so that the moving speed is faster when the vector $V_{1S}$ is smaller.

The control unit 11 changes the basic number of rotations of the ball 30 and determines the rotation direction of the ball 30 based on the vector $V_{1S}$, to thereby determine information about the rotation of the ball 30 (Step S77). In Step S77, the control unit 11 determines the number of rotations of the ball 30 so that the ball 30 rotates a larger number of rotations when the vector $V_{1S}$ is larger. The control unit 11 determines a counterclockwise direction from the viewpoint of the operation object as the rotation direction of the ball 30 when the vector $V_{1S}$ points rightward, and determines a clockwise direction from the viewpoint of the operation object as the rotation direction of the ball 30 when the vector $V_{1S}$ points leftward.

Returning to FIG. 11, the control unit 11 moves the ball 30 based on the pieces of information that have been determined in Step S7 (Step S8). The control unit 11 moves the ball 30 in the game space 20 by substituting, in the moving algorithm, parameters that are respectively contained in the pieces of information determined in Step S7.

The control unit 11 updates the game situation data (Step S9). In Step S9, the control unit 11 changes the state of each object placed in the game space 20, and changes the situation of the match in step with the progress of the game.

The control unit 11 determines whether or not an ending condition is satisfied (Step S10). The ending condition can be any condition for ending the processing, for example, whether or not an end time of the match has arrived, or whether or not the user has performed given ending operation. When it is determined that the ending condition is satisfied (Step S10: Y), the processing is ended. When it is determined that the ending condition is not satisfied (Step S10: N), on the other hand, the processing returns to Step S2.

The mobile terminal 10 described above determines information about the trajectory of the ball 30 based on a plurality of contact positions on the touch panel 15 where a user has touched the touch panel 15, and thus facilitates the operation of moving the ball 30 in the game space 20. In the above-mentioned game and similar games where the characters 26 (28) kick the ball 30, in particular, this provides operation in which the user's fingers are given the roles of the pivot foot and the kicking foot, thereby enabling the user to move the ball 30 through more intuitive operation.

In addition, the trajectory of the ball 30 is determined by contacts made by the user to the ball 30 and the field 22 which are displayed on the game screen 40, thereby making it easy to identify an area to be touched by the user out of the entire touch panel 15. In the above-mentioned game and similar games where the characters 26 (28) kick the ball 30, in particular, this provides intuitive operation as though kicking the ball 30 with the kicking foot of the user's operation object with the pivot foot of the operation object put on the field 22, which facilitates the operation of moving the ball 30.

Further, the trajectory of the ball 30 is determined based on the positional relation between the contact position Q and the reference positions 46A and 46B within the game screen 40, and the operation of moving the ball 30 in the game space 20 can accordingly be made more diverse with the use of the reference positions 46A and 46B. In the above-mentioned game and similar games where the characters 26 (28) kick the ball 30, in particular, this provides intuitive operation such as specifying on the touch panel 15 where to put the pivot foot of the user's operation object.

Moreover, the trajectory of the ball 30 changes depending on the location of the contact position P in the range where the ball 30 is displayed, and instructions for moving the ball 30 are diversified by considering the position of the contact position P in the ball 30. In the above-mentioned game and similar games where the characters 26 (28) kick the ball 30, in particular, this provides intuitive operation such as specifying on the touch panel 15 a position where the kicking foot of the user's operation object is to come into contact with the ball 30.

The mobile terminal 10 also performs control so that the ball 30 does not move much in the case where the contact position P is in the top area 44. Using the top area 44 therefore diversifies instructions for moving the ball 30. In the above-mentioned game and similar games where the characters 26 (28) kick the ball 30, in particular, this provides intuitive operation as though the user's operation object is dribbling by rolling the top of the ball 30 under the sole of the foot.

The mobile terminal 10 also changes at least one of the movement direction, moving speed, and rotation of the ball 30 out of pieces of information about the trajectory of the ball 30 in relation to the contact position P and the contact position Q, and thus facilitates the operation of changing these factors. In the above-mentioned game and similar games where the characters 26 (28) kick the ball 30, in particular, the movement direction, moving speed, and rotation of the ball 30 vary depending on the positional relation between the kicking foot and the pivot foot, and more intuitive operation can therefore be provided by changing these based on the positional relation of the contact positions.

5. Modification Examples

The present invention is not limited to the embodiment described above, and can be modified suitably without departing from the spirit of the present invention.

(1) For example, the trajectory of the ball 30 may be varied depending on whether or not the user has removed the contact between the finger that is given the role of the pivot foot and the touch panel when the ball 30 is moved.

The determination unit 54 of Modification Example (1) determines, when the moving control unit 56 starts moving a moving object (e.g., the ball 30), whether or not the contact is removed at either the first contact position or the second contact position that is outside an area corresponding to the moving object image (e.g., the field 22 in the game screen 40). "When the moving of the ball 30 is started" means a given period that includes the time when the ball 30 is beginning to be moved. Here, the user's lifting a finger from the touch panel 15 (i.e., that contact is no longer detected from the touch panel 15) corresponds to removing contact.

Based on the result of the above-mentioned determination, the determination unit 54 determines information about the trajectory of the moving object (e.g., the ball 30). The information about the trajectory of the ball 30 here includes a parameter that indicates the accuracy of movement (the accuracy of a kick, for example). In a moving algorithm of this modification example, the parameter indicating the accuracy affects changes in the movement direction, moving speed, rotation direction, and number of rotations of the ball 30 that are determined by the determination unit 54. The degrees of changes are smaller when the accuracy is higher and the degrees of changes are larger when the accuracy is lower.

For example, when it is determined that the contact is removed, the determination unit 54 determines information about the trajectory of the ball 30 so that the moving speed of the ball 30 is fast and so that the accuracy is low. When it is determined that the contact is not removed, on the other hand, the determination unit 54 determines information about the trajectory of the ball 30 so that the moving speed of the ball 30 is slow and so that the accuracy is high. It can be paraphrased that, based on the parameter that indicates the accuracy, the moving control unit 56 restricts the movement of the ball 30 along a trajectory of the information determined by the determination unit 54.

According to Modification Example (1), the trajectory of the ball 30 varies depending on, for example, whether or not contact that corresponds to the pivot foot is removed when the user's operation object kicks the ball 30. This provides the user with intuitive operation as though the character 26 kicks the ball 30 hard by putting all his/her weight behind the kick, and facilitates the operation of moving the ball 30 even more.

(2) To give another example, the position of the top area 44 in the game screen 40 may be varied depending on the positional relation between the ball 30 and the virtual camera 32.

The determination unit 54 of Modification Example (2) varies the position of a particular part (e.g., the top area 44) based on the position of a point of view (e.g., the virtual camera 32) in a virtual space (e.g., the game space 20) and the position of a moving object (e.g., the ball 30). The determination unit 54 varies the position of the top area 44 depending on the positional relation between the ball 30 and the virtual camera 32.

Figure 14:
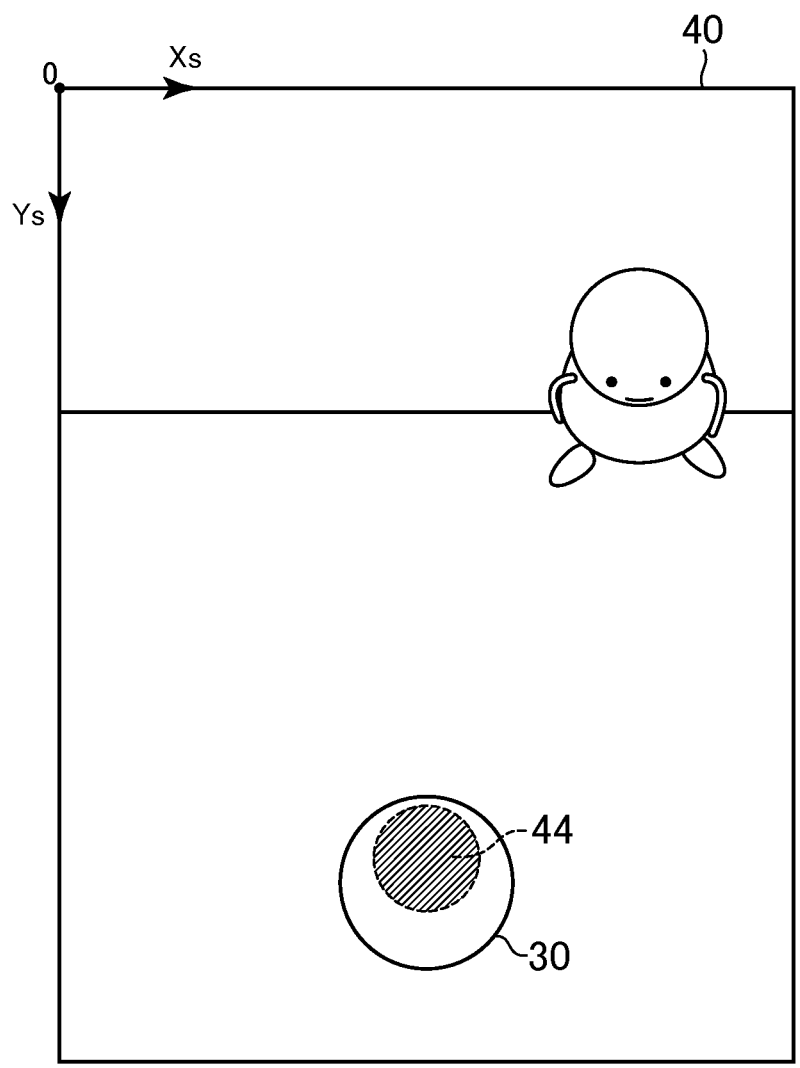
FIG. 14 is a figure showing another example of the game screen.

FIG. 14 is a figure showing an example of the game screen 40. When the virtual camera 32 is positioned so as to look down on the ball 30 from above as showed in FIG. 14, the position of the top area 44 of the ball 30 changes. The top area 44 can be any area of the ball 30 that is near the top (near a particular part) of the ball 30 and that is in view on the game screen 40. "Near the top" means a location on the surface area of the ball 30 that is within a given distance from the top of the ball 30.

The determination unit 54 determines whether or not the contact position P which is inside an area corresponding to the moving object image (for example, the ball 30 displayed on the game screen 40) is located in the changed particular part (for example, the top area 44). Whether or not the contact position P is included in the top area 44 is determined by the same method that has been described in the embodiment.

According to Modification Example (2), the top area 44 can be changed based on the positional relation between the ball 30 and the virtual camera 32, and more intuitive operation can thus be provided to the user in relation to the current states of the ball 30 and the virtual camera 32. In a game where the characters 26 (28) kick the ball 30, in particular, intuitive operation can be kept provided despite a change in positional relation between the ball 30 and the virtual camera 32 by changing an area for moving the ball 30 in a manner that rolls the top of the ball 30 under the sole of the foot.

(3) To give still another example, while the embodiment has described a case in which the user moves the ball 30 by touching a position in a range where the ball 30 is displayed, operation that the user can perform to move the ball 30 is not limited thereto. The user may move the ball 30 by, for example, sliding a finger on the touch panel 15.

The determination unit 54 of Modification Example (3) determines information about the trajectory of a moving object based on a change direction of the contact position P, which is either the first contact position or the second contact position that is inside an area corresponding to the moving object image (e.g., the ball 30 on the game screen 40). The change direction of the contact position P is a direction in which the contact position P changes without removing the contact. Contact position conditions here include a condition about the change direction of the contact position P. For instance, the contact position condition is about whether or not the change direction of the contact position P is in a given direction. The trajectory characteristics information is defined so that, for example, the ball 30 moves in a direction in the game space 40 that corresponds to the change direction of the contact position P.

In the case where the contact position P is to the right of the center point 42 and the change direction of the contact position P is a rightward direction, for example, the determination unit 54 determines information about the trajectory of the ball 30 so that the movement direction of the ball 30 is to the right of the basic movement direction, and so that the ball 30 rotates a large number of rotations in the counterclockwise direction.

In the case where the contact position P is to the right of the center point 42 and the change direction of the contact position P is a leftward direction, for example, the determination unit 54 determines information about the trajectory of the ball 30 so that the movement direction of the ball 30 is to the left of the basic movement direction, and so that the ball 30 rotates a large number of rotations in the clockwise direction.

In the case where the contact position P is to the left of the center point 42 and the change direction of the contact position P is the leftward direction, for example, the determination unit 54 determines information about the trajectory of the ball 30 so that the movement direction of the ball 30 is to the left of the basic movement direction, and so that the ball 30 rotates a large number of rotations in the clockwise direction.

In the case where the contact position P is to the left of the center point 42 and the change direction of the contact position P is the rightward direction, for example, the determination unit 54 determines information about the trajectory of the ball 30 so that the movement direction of the ball 30 is to the right of the basic movement direction, and so that the ball 30 rotates a large number of rotations in the counterclockwise direction.

According to Modification Example (3), the trajectory of the ball 30 is varied depending on the direction of the user's sliding operation, and intuitive operation as though actually kicking a ball can thus be provided to the user.

(4) To give yet still another example, when the ball 30 is moved by the user's sliding operation as in Modification Example (3), the behavior of the ball 30 may be varied depending on whether the sliding motion is made from the outside to the inside of the ball 30 or only inside the ball 30.

The determination unit 54 of Modification Example (4) determines whether or not the contact position P, which is either the first contact position or the second contact position that is inside an area corresponding to the moving object image (e.g., the ball 30 on the game screen 40), is located in this area as a result of the move from the outside of this area to the inside of this area. In the case where the contact position P is included in the ball 30, the determination unit 54 determines whether or not the contact position P has been outside the ball 30 prior to the current time (for example, a time point that precedes the current time by a given length of time). In other words, the determination unit 54 determines, for example, whether or not the contact P has been outside the ball 30 at the start of the contact and then entered the ball 30 without removing the contact.

Based on the result of the above-mentioned determination, the determination unit 54 determines information about the trajectory of the moving object (e.g., the ball 30). When the answer to the above-mentioned determination is positive, the determination unit 54 determines information about the trajectory of the ball 30 so that the ball 30 rotates a large number of rotations in a longitudinal direction from the viewpoint of the operation object. When the answer to the above-mentioned determination is negative, the determination unit 54 determines information about the trajectory of the ball 30 so that the ball 30 rotates a small number of rotations in a lateral direction from the viewpoint of the operation object.

According to Modification Example (4), intuitive operation as though making the ball 30 spin hard longitudinally, for example, can be provided to the user by taking into account the previous position of the user's contact position P which is now in a range where the ball 30 is displayed.

(5) To give yet still another example, the level of rotation of the ball 30 in Modification Example (4) may be changed based on the sliding speed of the user's sliding operation.

The determination unit 54 of Modification Example (5) determines information about the trajectory of a moving object based on the moving speed of the contact position P (the changing speed of the contact position P), which is either the first contact position or the second contact position that is inside an area corresponding to the moving object image (e.g., the ball 30 on the game screen 40), in a move from the outside of this area to the inside of this area. A contact position condition here is a condition about the changing speed of the contact position P, for example, a condition about whether or not the changing speed of the contact position P is equal to or more than a reference speed. The determination unit 54 determines information about the trajectory of the ball 30 based on a piece of trajectory characteristics information that is associated with a condition satisfied by the changing speed of the contact position P.

For instance, the determination unit 54 determines information about the trajectory of the ball 30 so that the ball 30 rotates a larger number of rotations when the changing speed of the contact position P is higher. The determination unit 54 also determines information about the trajectory of the ball 30 so that, for example, the moving speed of the ball 30 is faster when the changing speed of the contact position P is higher.

According to Modification Example (5), the trajectory of the ball 30 can be varied depending on the moving speed of the contact position P, and intuitive operation as though actually kicking the ball 30 hard can thus be provided to the user.

(6) To give yet still another example, in the case where the user makes a plurality of contacts, the trajectory of the ball 30 may be varied based on the time interval between the start of one of the contacts and the start of another of the contacts.

The determination unit 54 of Modification Example (6) obtains information about a length of time measured from when either the first contact position or the second contact position is obtained until when the other contact position is obtained. For instance, the determination unit 54 measures a length of time from the start of the first contact to the start of the second contact.

Based on the obtained information about the length of time, the determination unit 54 determines information about the trajectory of a moving object. Contact position conditions here include a condition about time, for example, a condition about whether or not the time interval between the start of the first contact and the start of the second contact is equal to or more than a reference interval. For instance, the determination unit 54 determines information about the trajectory of the ball 30 based on a piece of trajectory characteristics information that is associated with a condition satisfied by the obtained length of time.

The determination unit 54 determines the information about the trajectory of the ball 30 so that, for example, the moving speed of the ball 30 is faster when the obtained length of time is longer. The determination unit 54 may instead determine information about the trajectory of the ball 30 so that the moving speed of the ball 30 is faster when the obtained length of time is shorter.

According to Modification Example (6), the trajectory of the ball 30 can be changed in relation to the time when the contact position P is obtained and the time when the contact position Q is obtained. This provides the user with intuitive operation as though setting the pivot foot on the ground and building up power in the leg before kicking the ball 30, or immediately kicking the ball 30, for example.

(7) To give yet still another example, the method of determining information about the trajectory of the ball 30 is not limited to the examples given above. The determination unit 54 can use any method that determines information about the trajectory of the ball 30 based on the contact position P and the contact position Q. For instance, information about the trajectory of the ball 30 may be determined so that the user's operation object is not allowed to kick the ball 30 or miskicks when the contact position Q which is given the role of the pivot foot is too far from the reference position 46A or 46B.

While the embodiment has described a case where the center point 42 and the reference positions 46A and 46B are set based on the position of the ball 30 in Step S4, Step S4 may not be executed in the case where the display position of the ball 30 on the game screen 40 is always the same, for example. For instance, in the case where the ball alone is displayed in the same place on a separate screen, the center point 42 and the reference positions 46A and 46B on the screen do not change, and in this case, predetermined positions may therefore be used as the center point 42 and the reference positions 46A and 46B instead of setting the center point 42 and the reference positions 46A and 46B based on the position of the ball 30.

While the reference positions 46A and 46B described above are set in the game screen 40, a reference position set in the game space 20 may be used, for example. The determination unit 54 in this case determines information about the trajectory of the ball 30 based on a position in the game space 20 that corresponds to the contact position Q and the reference position in the game space 20. The determination unit 54 may instead determine information about the trajectory of the ball 30 based on the contact position Q and a position in the game screen 40 that corresponds to the reference position in the game space 20.

The contact position conditions may be varied depending on the user's operation object, for example. For instance, the contact position conditions may be varied depending on the dominant foot or ability value of the user's operation object. The basic movement direction, for example, is not limited to the examples given above, and can be any direction that is associated with the ball 30. For instance, the current movement direction of the ball 30 may correspond to the basic movement direction.

While the basic moving speed described above is determined based on the ability value of the user's operation object, a predetermined speed may be used as the basic moving speed, for example. While the basic number of rotations described above is a predetermined number of rotations, the basic number of rotations may be determined based on a parameter of the user's operation object, for example.

The ball 30 may not be displayed on the game screen 40, for example. In this case, either the contact position P or the contact position Q that is obtained first may be given the role of the pivot foot whereas the contact position that is obtained later is given the role of the kicking foot, for example.

While a case where the ball 30 moves when the user touches the ball 30 has been described, the ball 30 may be moved when the user touches and then slides the ball 30, for example. The ball 30 may also start moving when the user removes contact to the ball 30 or to the field 22.

While the ball 30 corresponds to the moving object in the description given above, the moving object is not limited thereto, for example. The moving object can be any object that moves in a virtual space. While the game space 20 described above is a three-dimensional space as the one showed in FIG. 2, a game space according to the present invention can be a two-dimensional game space in which the positions of the characters 26 (28), the position of the ball 30, and the like are each managed with the use of two coordinate elements, for example.

The present invention is also applicable to mobile terminals configured to execute other games than a soccer game, for example. The present invention can be applied to any mobile terminal configured to execute a game in which a moving object is moved in a virtual space, for example, other sports games than a soccer game. The present invention can also be applied to mobile terminals configured to execute still other games such as action games and role-playing games. The application of the present invention is not limited to video games, and moving control according to the present invention is also applicable to the simulation of a moving object in a real world.

A moving control device according to the present invention is also applicable to various other computers than mobile terminals, for example. For instance, a server device connected by a network to a terminal that is operated by a user may correspond to the moving control device. In this case, the server device implements the respective function blocks while the terminal operated by a user mainly detects the user's operation and displays a screen.

While a case where the user operates the mobile terminal with his/her index finger and middle finger has been described, fingers with which the touch panel 15 is touched are not limited to the index finger and the middle finger, for example. The user can use his/her own body part or an object gripped by the user to touch the touch panel 15. The user may also use, for example, fingers of both of his/her hands to touch the touch panel 15.

6. Summary of the Invention

From the description given above, the present invention is understood as follows, for example. According to one embodiment of the present invention, there is provided a moving control device (10), including: an obtaining unit (52) that obtains a first contact position and a second contact position on a touch panel; a determination unit (54) that determines information about a trajectory of a moving object in a virtual space based on the first contact position and the second contact position; and a control unit (56) that controls moving of the moving object in the virtual space based on the information.

According to one embodiment of the present invention, there is provided a moving control method, including:

obtaining (52) a first contact position and a second contact position on a touch panel; determining (54) information about a trajectory of a moving object in a virtual space based on the first contact position and the second contact position; and controlling (56) moving of the moving object in the virtual space based on the information.

According to one embodiment of the present invention, there is provided a program for causing a computer to perform a function of: obtaining (52) a first contact position and a second contact position on a touch panel; determining (54) information about a trajectory of a moving object in a virtual space based on the first contact position and the second contact position; and controlling (56) moving of the moving object in the virtual space based on the information.

Further, according to one embodiment of the present invention, there is provided a non-transitory computer-readable information recording medium having the above-mentioned program recorded thereon.

Further, in one aspect of the present invention, the touch panel is provided so as to be overlaid on a display screen, which displays a moving object image representing the moving object, and the determination unit (54) determines the information based on the first contact position and the second contact position in a case where one of the first contact position and the second contact position is inside an area that corresponds to the moving object image and the other is outside the area.

Further, in one aspect of the present invention, the determination unit (54) determines the information based on one of the first contact position and the second contact position that is outside the area, and a reference position which is associated with the moving object in one of the display screen and the virtual space.

Further, in one aspect of the present invention, the determination unit (54) includes a remove determination unit (54) that determines, in a case where the moving object starts to move, whether or not contact is removed at either the first contact position or the second contact position that is outside the area, and the determination unit (54) determines the information based on a result of the determination made by the remove determination unit (54).

Further, in one aspect of the present invention, the determination unit (54) determines the information based on a position in the area of either the first contact position or the second contact position that is inside the area.

Further, in one aspect of the present invention, the determination unit (54) includes a location determination unit (54) that determines whether or not either the first contact position or the second contact position that is inside the area is located in a particular part of the area, and the determination unit (54) determines the information based on a result of the determination made by the location determination unit (54).

Further, in one aspect of the present invention, the determination unit (54) further includes a changing unit (54) that changes a position of the particular part based on a position of a view point in the virtual space and a position of the moving object in the virtual space, and the determination unit (54) determines whether or not either the first contact position or the second contact position that is inside the area is located in the changed particular part.

Further, in one aspect of the present invention, the determination unit (54) determines the information based on a change direction of either the first contact position or the second contact position that is inside the area.

Further, in one aspect of the present invention, the determination unit (54) includes a location determination unit (54) that determines whether or not either the first contact position or the second contact position that is inside the area is located in the area as a result of a move from outside the area to inside the area, and the determination unit (54) determines the information based on a result of the determination made by the location determination unit (54).

Further, in one aspect of the present invention, the determination unit (54) determines the information based on a moving speed of either the first contact position or the second contact position that is inside the area, in a move from outside the area to inside the area.

Further, in one aspect of the present invention, the determination unit (54) includes a time obtaining unit (54) that obtains time information about a length of time from when either the first contact position or the second contact position is obtained until when the other is obtained, and the determination unit (54) determines the information based on the time information.

Further, in one aspect of the present invention, the determination unit (54) determines the information that includes moving information about at least one of the movement direction, moving speed, and rotation of the moving object based on the first contact position and the second contact position, and wherein the control unit (56) moves the moving object in the virtual space based on the moving information.

The description given above includes parenthesized reference symbols that are used in the accompanying drawings for easier understanding of the present invention. However, this does not limit the moving control device and others according to one embodiment of the present invention to the showed modes.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A moving control device, comprising at least one processor configured to:
   cause a display screen to display a moving object image representing a moving object in a virtual space;
   if two positions on a touch panel are contacted by a multi-touch operation, the touch panel being overlaid on the display screen, obtain the two positions as a first contact position and a second contact position;
   determine information about a trajectory of the moving object based on the first contact position and the second contact position which are contacted by the multi-touch operation, if the first contact position is outside an area that corresponds to the moving object image and the second contact position is inside the area; and
   control moving of the moving object in the virtual space based on the information.

2. The moving control device according to claim 1, the at least one processor determines the information based on the first contact position that is outside the area, and a reference position which is associated with the moving object in one of the display screen and the virtual space.

3. The moving control device according to claim 1, the at least one processor:
   determines, if the moving object starts to move, whether or not contact is removed at the first contact position that is outside the area; and
   determines the information based on a result of the determination.

4. The moving control device according to claim 1, the at least one processor determines the information based on a position in the area of the second contact position that is inside the area.

5. The moving control device according to claim 4, the at least one processor:
   determines whether or not the second contact position that is inside the area is located in a particular part of the area; and
   determines the information based on a result of the determination.

6. The moving control device according to claim 5,
   the at least one processor:
   changes a position of the particular part based on a position of a view point in the virtual space and a position of the moving object in the virtual space; and
   determines whether or not the second contact position that is inside the area is located in the changed particular part.

7. The moving control device according to claim 1, the at least one processor determines the information based on a change direction of the second contact position that is inside the area.

8. The moving control device according to claim 1, the at least one processor:
   determines whether or not the second contact position that is inside the area is located in the area as a result of a move from outside the area to inside the area; and
   determines the information based on a result of the determination.

9. The moving control device according to claim 8, the at least one processor determines the information based on a moving speed of the second contact position that is inside the area, in a move from outside the area to inside the area.

10. The moving control device according to claim 1, the at least one processor:
    obtains time information about a length of time from when either the first contact position or the second contact position is obtained until when the other is obtained; and
    determines the information based on the time information.

11. The moving control device according to claim 1,
    the at least one processor:
    determines the information that includes moving information about at least one of the movement direction, moving speed, and rotation of the moving object based on the first contact position and the second contact position; and
    moves the moving object in the virtual space based on the moving information.

12. A moving control method, comprising:
    causing a display screen to display a moving object image representing a moving object in a virtual space;
    if two positions on a touch panel are contacted by a multi-touch operation, the touch panel being overlaid on the display screen, obtaining the two positions as a first contact position and a second contact position;
    determining information about a trajectory of the moving object based on the first contact position and the second contact position which are contacted by the multi-touch operation, if the first contact position is outside an area that corresponds to the moving object image and the second contact position is inside the area; and
    controlling moving of the moving object in the virtual space based on the information.

13. A non-transitory computer-readable information recording medium having recorded thereon a program for causing a computer to perform a function of:
    causing a display screen to display a moving object image representing a moving object in a virtual space;
    if two positions on a touch panel are contacted by a multi-touch operation, the touch panel being overlaid on the display screen, obtaining the two positions as a first contact position and a second contact position;
    determining information about a trajectory of the moving object based on the first contact position and the second contact position which are contacted by the multi-touch operation, if the first contact position is outside an area that corresponds to the moving object image and the second contact position is inside the area; and
    controlling moving of the moving object in the virtual space based on the information.

14. The moving control device according to claim 1, if a new position, which is different from the first contact position, is contacted while keeping contact at the first contact position, the at least one processor obtains the new position as the second contact position.

15. The moving control device according to claim 1, further comprising a game character that is an operation target of a user,
    wherein the moving object is a ball that the game character kicks and the at least one processor determines a kicking foot and a pivot foot based on the first contact position and the second contact position of the user.

* * * * *